United States Patent
Koschorrek et al.

[11] Patent Number: 5,942,870
[45] Date of Patent: Aug. 24, 1999

[54] PROCESS AND APPARATUS FOR POSITIONING AN OBJECT

[75] Inventors: Rolf Koschorrek, Wetter; Stefan Elspass, Tönisvorst; Michael Hülsmann, Herdecke, all of Germany

[73] Assignee: Mannesmann Aktiengesellschaft, Düsseldorf, Germany

[21] Appl. No.: 08/837,612

[22] Filed: Apr. 21, 1997

[30] Foreign Application Priority Data

Apr. 19, 1996 [DE] Germany .............................. 196 17 107

[51] Int. Cl.⁶ ..................................................... H02P 5/05
[52] U.S. Cl. .......................... 318/610; 318/560; 318/611; 318/626; 318/270
[58] Field of Search ..................................... 318/138, 139, 318/245, 254, 270, 273, 560, 611, 612, 613, 626, 610

[56] References Cited

U.S. PATENT DOCUMENTS

| | | | |
|---|---|---|---|
| 4,769,580 | 9/1988 | Heidelberg et al. | 318/135 |
| 5,250,884 | 10/1993 | Okumura | 318/560 |
| 5,752,214 | 5/1998 | Minowa et al. | 701/111 |
| 5,852,355 | 12/1998 | Turner | 318/701 |

FOREIGN PATENT DOCUMENTS

| | | |
|---|---|---|
| 0087812 | 9/1983 | European Pat. Off. . |
| 3226362 | 1/1984 | Germany . |
| 4411390 | 10/1994 | Germany . |

OTHER PUBLICATIONS

"Positioniercontroller Gel 7100"; pp. 1–12; Lenord & Bauer, Sep. 1988.
"Aufzugsregelanlagen"; H. Greiner; pp. 408–417, Jul. 9, 1972.
"Stellantriebe" pp. 56–58; Elektrotechnik, Sep. 10, 1985.

*Primary Examiner*—Paul Ip
*Attorney, Agent, or Firm*—Cohen, Pontani, Lieberman & Pavane

[57] ABSTRACT

A process and apparatus for positioning an object being moved along a path to a destination using a pole changing three-phase induction motor having at least two fixed driving speeds. The object is initially accelerated along the path of movement to the highest driving speed of the motor, during which the acceleration curve is determined and stored. The acceleration data is then used to calculate the location along the path in advance of the destination at which the motor is switched off and braked until reaching the next lower driving speed, whereupon the motor is operated at the next lower driving speed for a predetermined path length. The motor is then again switched off and braked until its driving speed reaches zero closely proximate the destination, at which point a motor in a gear assembly attached to the motor is operated for final low speed positioning of the object at the destination with a high degree of accuracy. The calculation of the initial switch-off location using, in the preferred embodiment, the dynamically-determined acceleration curve results in rapid and highly accurate object positioning without the need for undesirable buffer paths.

20 Claims, 4 Drawing Sheets

PROCESS AND APPARATUS FOR POSITIONING AN OBJECT

BACKGROUND OF THE INVENTION

1. Field of the Invention

The present invention is directed to a process and apparatus for positioning an object by means of a drive having at least two fixed driving speeds and comprising an electric motor which, prior to being switched to operate at the next lower driving speed from the approximately highest driving speed, is switched off at a predetermined switch-off location in advance of a given destination for the object and is braked until reaching the next lower driving speed.

2. Description of Related Art

The Lenord & Bauer GEL Model 7100 Positioning Controller is a known positioning apparatus with a pole changing three-phase motor having several fixed driving speeds. During positioning, in order to switch to the next lower driving speed from the highest driving speed, the drive is switched off at a predetermined distance before a given destination and then braked until the next lower driving speed is attained or reached. When using this positioning controller, the distance between the switch-off locations and the respective destination is always identical for all permissible drive loads for one and the same driving speed. Different drive loads, however, effect or change the acceleration behavior and braking behavior of the positioning apparatus, and this positioning process must accordingly be intercepted or interrupted within the deceleration path by the inclusion of buffer paths, the lengths of which correspond with the individual fixed driving speeds. The buffer path lengths are selected so that the next lower speed may still be switched to at the maximum allowed drive load such that the destination may eventually be approached by proceeding at the slowest available driving speed to achieve a high target accuracy. As a result of the very long buffer paths thus, required, this prior art positioning process is relatively slow.

Conventional apparatus and processes for positioning an object device by means of a frequency converter for a three-phase motor controlled by a distance sensor are also known. A given destination is set by the frequency converter which changes the rate of rotation of the motor based on the remaining distance from the destination such that the device arrives at the target position in a highly accurate manner. This prior art apparatus and process is disadvantageous, however, in that the frequency converter is relatively expensive and sensitive.

Thus, the principal object of the present invention is to provide a process and apparatus for relatively rapid positioning of an object with high positioning accuracy over a relatively extended load range by means of a drive having at least two fixed driving speeds and utilize a relatively inexpensive pole changing three-phase asynchronous motor or induction motor. In the inventive positioning technique the motor switches off and is braked from the highest respective driving speed at a calibrated, predetermined switch-off location in advance of a given destination and is subsequently switched to the next lower drive speed without the need for unwanted buffer paths (which would otherwise increase the positioning time) to achieve relatively high positioning accuracy.

SUMMARY OF THE INVENTION

Relatively rapid and accurate positioning of an object is achieved using the positioning process and apparatus of the invention which includes a relatively inexpensive, low-maintenance motor operable to provide at least two fixed driving speeds. The buffer paths which would otherwise be required in accordance with the prior art to achieve relatively high positioning accuracy over an extended load range are rendered unnecessary by the invention in accordance with which the acceleration curve is measured and the switch-off locations for the individual driving steps or segments are determined automatically as a function of the measured acceleration curve.

In accordance with the inventive process, the anticipated length of the deceleration path is calculated based on the measured acceleration curve, and the switch-off locations for the individual driving speed segments are determined using the calculated deceleration path. Unavoidable variations in length of the deceleration path are provided for when determining the switch-off locations.

The acceleration curve of the device as a function of load is stored as the acceleration path in a deceleration path memory device along with the respective deceleration path, and the switch-off locations for the individual driving speeds are calculated with the aid of the stored values in accordance with the measured acceleration path over the respective deceleration path. This enables nonlinear relationships between the load path and acceleration path to be taken into account in the calculations. The deceleration path is then calculated by interpolating neighboring stored values.

Alternatively, the switch-off locations may be calculated by means of a mathematical model of the acceleration behavior and braking behavior of the drive as a function of drive speed under changing load conditions. The actual motor parameters are incorporated into the model, and are measured or determined in a lead-through or learning process, generally during an initial or start-up operation. These parameters are subsequently used for calculating the acceleration path and deceleration path of the drive under changing load conditions using the mathematical model.

The acceleration path and deceleration path of the off-load drive are determined, for safety reasons during initial or start-up operation of the device, and a minimum distance of the switch-off location from the destination is determined therefrom for the various respective driving speeds. This minimum distance is used to position the load-free or unloaded device without the use of additional or unnecessary extra expenditure of power.

The time curve of the deceleration path is stored during every positioning process. Thus, when a predetermined maximum deviation from the destination is exceeded, e.g. the destination is missed or passed by more than a predetermined deviation, the device is returned or moved back again to a position or location upstream or in advance of the destination and the positioning process is repeated using the stored values.

In a preferred form of the invention, the individual target positions are input to the memory device by manually moving towards each individual desired target position using a control switch and actuating a learning key on the control switch when the desired target position is reached. Thus, there is no need for an exact measurement of the target positions. The target information is preferably stored in a non-volatile memory to prevent loss of information during power loss or outages. In a preferred embodiment of the invention, a plurality of target positions are stored so that a relatively large number of target positions may be moved toward cyclically. Extremely high positioning accuracy is achieved because the destination or target is always moved toward by advancing, proximate the destination, at the lowest speed.

The inventive apparatus for positioning an object may be constructed so as to include an intermediate gear assembly of a control device that is connected to the motor and which is actuated based on a program and a path measurement system connected to the motor and the control device. In this construction, information about the location, movement direction and moving speed of the device is continuously transmitted to the control device by the path measurement system, as for example an incremental path measurement system or a path measurement system employing absolute coding. To modify the positioning, a computer provided with appropriate software may be connected to the programmed control device and/or to a hand-held control device. A coding switch for presetting the target or destination is connected to the control device; preferably the coding switch is in a hand control device. Thus, the preset targets are input using the coding switch without the need to take and input specific measurements, and the start of the positioning process is triggered manually. The hand control device contains the coding switch for presetting the exact target.

The control device includes a memory in which the acceleration paths and respective deceleration paths for the object(s) which are associated with the driving speeds are stored in tabular form as a function of load.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS drawings, wherein like reference numerals denote similar elements views.

DETAILED DESCRIPTION OF THE PRESENTLY PREFERRED EMBODIMENTS

Figure 1:
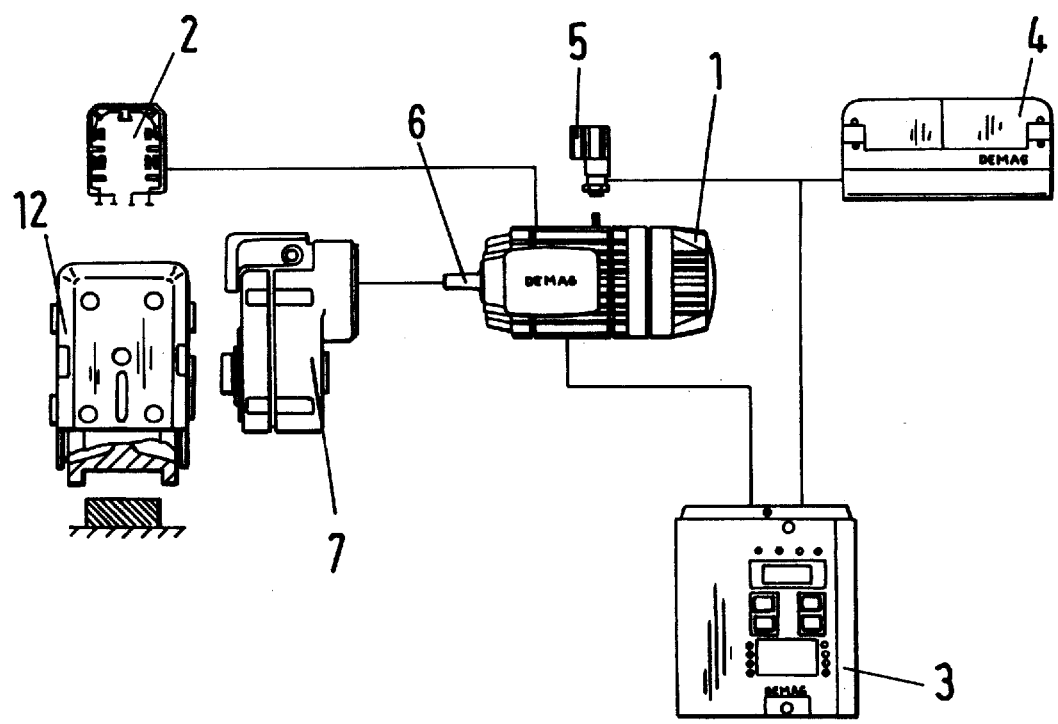
FIG. 1 depicts an apparatus for positioning an object in accordance with the present invention.

As shown in FIG. 1 the positioning device of the present invention includes a drive implemented by a pole changing three-phase induction motor 1 connected to an electronic power supply 2. The stator of the three-phase induction motor 1 is provided with two separate windings that are selectively connectable to the electric power supply 2. A control device 3, which is also connected to the motor 1, provides automatic adjustment or control of a respective preset driving speed for each of the two windings through selective connection of the windings to the power supply 2 by a switch in the control device 3. The driving speed is adjusted through and using the data provided by a path measurement system 4 that preferably measures the revolutions of the motor axle with a position sensor 5. In an alternate embodiment or modification, the position may be detected at the gear device or directly at the traveled segment or by the distance traveled. Information concerning the location, movement direction and speed of the object is continuously transmitted by the path measurement system 4 to control device 3. Although in FIG. 1 the path measurement system 4 and control device 3 are shown as separated, the path measurement system 4 may likewise be incorporated in whole or part within the structure of control device 3. Control device 3 includes an electronic control program for evaluating the information received from the path measurement system 4; this electronic control program generates and transmits control pulses or signals by which the supply of power from the power supply 2 to a selected one of the windings of the motor 1 is switched on and off on the basis of predetermined switch-off locations. The motor axle 6 is connected to an operable intermediate gear device 7. The gear device 7 includes its own drive motor which, in conjunction with the gears, provides separate and independent fine-motion object positioning by the induction motor 1. An object to be positioned, such as a wheel block or gear block 12, is supportedly connected to the motor axle 6 and/or gear unit 7.

Thus, the control device 3 operates to switch on and off the supply of power to each of the two windings of the induction motor 1 and/or the motor of the gear device 7. In addition, control device 3 operatively maintains a predetermined driving or movement speed once that speed is reached or attained and, after the motor 1 or the gear device 7 is switched off so as to change to the next lower driving speed, switches on the device responsible for providing this lower driving speed—i.e. one of the two windings of motor 1 or the motor of the gear device 7—when that lower speed has been reached. Upon reaching a predetermined switch-off location upstream of a preset destination, the corresponding drive device can again be switched off by the control device 3.

Control device 3 includes an electronic memory for storing the acceleration path required to reach the approximately highest driving speed, and another memory for storing a table of the acceleration and deceleration paths of the device which are associated with the several driving speeds as a function of load. In an alternate embodiment or modification, the control device 3 includes a computer 8 for determining the deceleration path based on the detected acceleration path using a mathematical model of the acceleration behavior and braking behavior of the drive as a function of drive load. A linear relationship is assumed between the measured acceleration path and the anticipated deceleration path. Simply put, the fixed driving speeds of the positioning process always also include "zero" driving speed—i.e. in the simplest case, the motor 1 with the control device 3 has a driving speed that can be reduced to a second driving speed equaling zero by switching off and braking the motor 1. Drives with only one driving speed not equal to zero, that is with exactly two driving speeds, represent an important and relatively common instance in which positioning accuracy is nevertheless of utmost priority.

Figure 2:
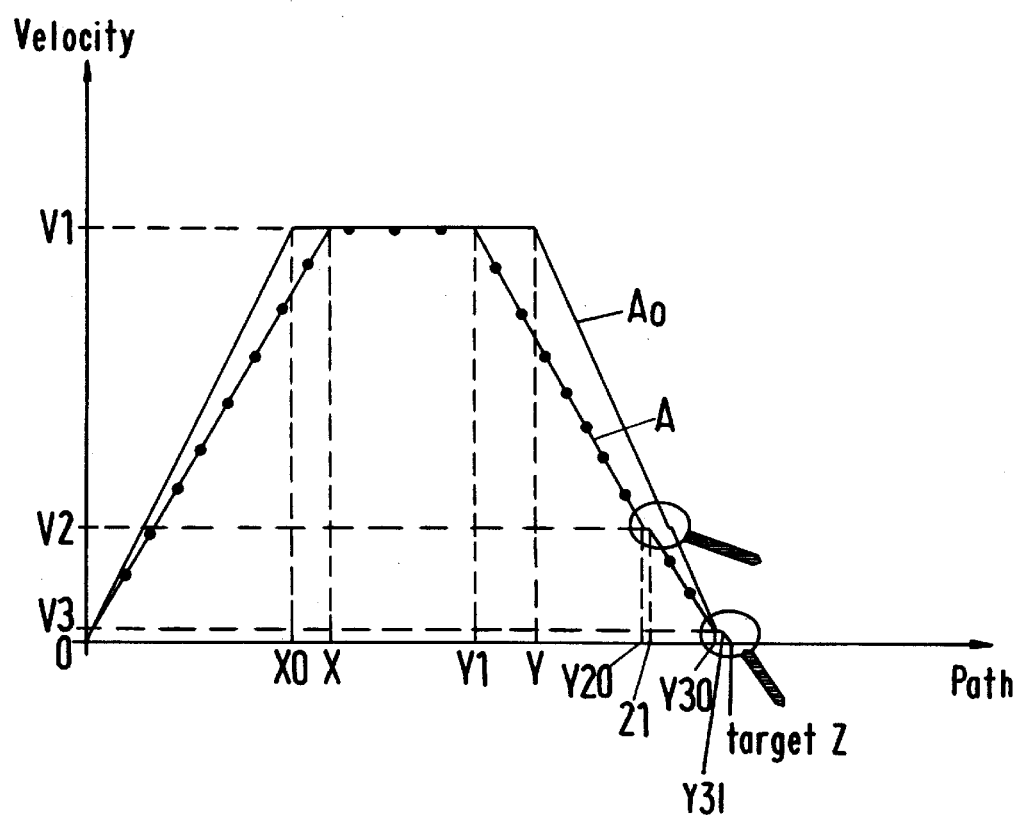
FIG. 2 is a graph of velocity as a function of path in the positioning process of the present invention, shown both with and without the effect of load.

To position an object which is then or initially located at an arbitrary location or position at zero speed, the control device 3 connects one of the windings of the motor 1 to the power supply 2 and drives the motor to its approximately highest driving speed. FIG. 2 depicts by way of example a graph of moving or positioning velocity as a function of path or distance from the destination in the positioning process and apparatus of the invention both with and without the effect of load—i.e. in both the loaded and unloaded conditions. The device is first accelerated from zero speed to the maximum or highest speed $V_1$; the result with the load is denoted by curve A, while the result without the load, i.e. unloaded, is denoted by curve $A_0$. After reaching speed $V_1$, the control device 3 controls the motor 1 so as to prevent further acceleration and constant speed. The acceleration path X of the load-carrying drive is detected by control device 3 and compared with the stored acceleration path $X_0$ of the unloaded drive. Using this information, the control device 3 determines the deceleration path $Z-Y_1$ and, accordingly, the switch-off location $Y_1$ based on the path difference $X-X_0$. When the switch-off location $Y_1$ is reached, the then-actuated winding of the motor 1 is switched off and an electric brake is switched on, as for example by interrupting or discontinuing the supply of power to the first or one of the three conductors of power to the motor. In an alternate embodiment a separate mechanical brake may be provided and applied on after switching off the initially-activated winding of the motor 1.

When the speed of the device then drops or is reduced to a predetermined speed $V_2$, the second winding of the motor 1 is connected to the power supply 2 by the control device 3. After thereafter reaching path point $Y_{21}$, the second winding is similarly cut off or disconnected from the power supply 2 and an electrical or mechanical brake is likewise switched on or applied. When the braked device then slows to a predetermined speed $V_3$, the brake is released and the motor of gear device 7 is switched on by control unit 3. Next, when point $Y_{31}$ is reached, the gear motor device is also switched off and a mechanical brake that is provided for this last driving stage is applied. The braked device then comes to a stop in the region of the destination or target Z.

The process for automatically determining the appropriate switch-off locations $Y_1$, $Y_{21}$, $Y_{31}$ by control device 3 will now be described. In particular, based on the measured underload acceleration path X, the respective deceleration paths $Y_{20}-Y_1$, $Y_{30}-Y_{21}$ and $Z-Y_{31}$ are determined using the stored deceleration path values. The deceleration path segments $Y_{21}-Y_{20}$ and $Y_{31}-Y_{30}$, in each of which a constant driving speed is maintained by the control device 3, are predeterminately fixed irrespective of load and, to the extent that they vary at all, do so only as a result of inevitable variations in deceleration path length. By determining the switch-off locations $Y_1$, $Y_{21}$ and $Y_{31}$ while taking into account these possible minor fluctuations in the deceleration path segments $Y_{21}-Y_{20}$ and $Y_{31}-Y_{30}$, the device is positioned relatively quickly and in a highly accurate manner relative to the target, since the drive is switched off and braked at relatively precisely calculated switch-off locations or positions without the need for compensating paths or buffer paths.

To keep the number of acceleration paths that are stored together with the associated deceleration paths in the deceleration path memory from becoming too large, only a limited number of possible acceleration and associated deceleration paths are stored. The respective deceleration paths for measured acceleration paths lying between data sets of two stored acceleration paths already stored in memory are determined by interpolation using the applicable stored deceleration paths. The deceleration paths and, accordingly, the switch-off locations may alternatively be calculated using a mathematical model in lieu of the stored data table. Such a mathematical model contains the acceleration behavior and braking behavior of the drive as a function of driving speed. The parameters which are needed for such a mathematical model and which describe the real system are measured during a one-time-only learning operation, as for example during operational setup or start-up.

The device when operated at start-up determines the acceleration path and the deceleration path of the unloaded drive and a minimum distance of the switch-off locations from the destination for the individual driving speeds.

When the control device determines that the destination lies outside of a default or permissible error range, then the positioning process is repeated so that the device is returned upstream or away from the target position. The time curve of the deceleration path is stored for every positioning process or event for enhanced accuracy of the positioning process under the control of the control device 3 and ready repetition of object placement using the stored values.

Figure 3:
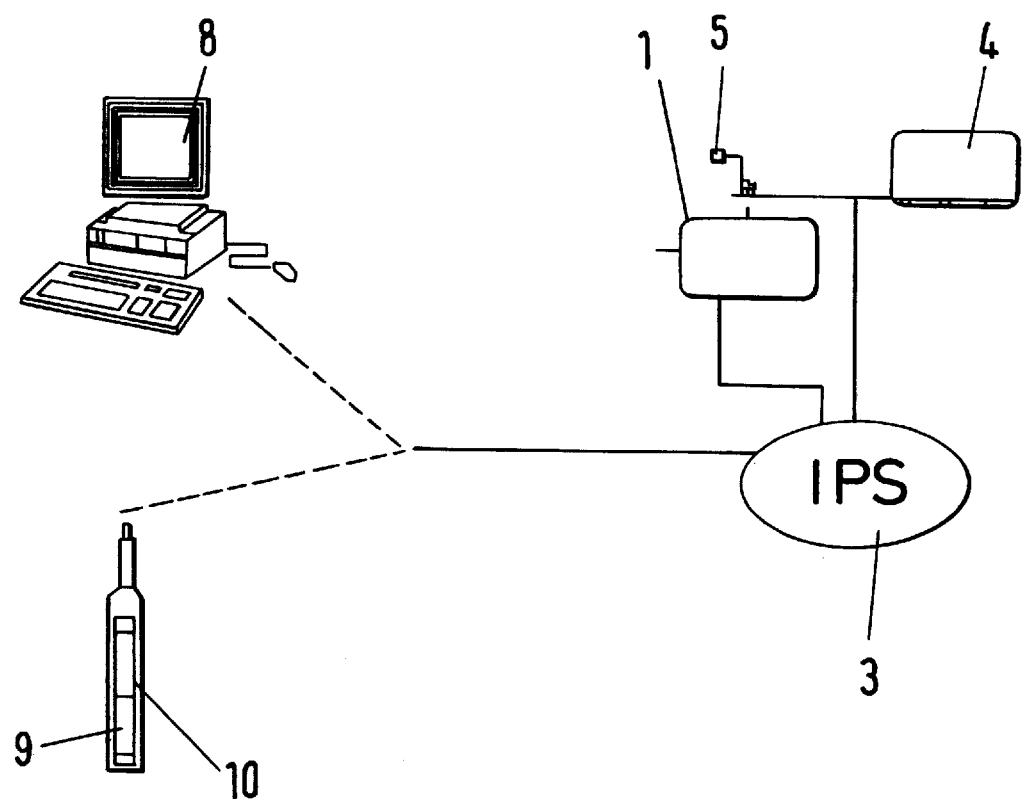
FIG. 3 depicts a preferred form of an apparatus for positioning an object in accordance with the present invention including a computer and a control device.

A plurality of target positions, for example 256 target positions, may be stored in memory beforehand to facilitate object movement to any of these locations. As shown in FIG. 3, the target positions may in another embodiment be entered or input, as in the form of numeric values, by a computer 8 which is connected to the programmed control device 3 and/or by a hand-held control device 10 having a control switch and which is connected to the programmed control device 3. In another construction, an operable coding switch 9 for presetting the target positions is connected to the control device for preselecting the target and manually triggering operation of the positioning device. In a preferred form of this invention, the coding switch 9 is located in the hand control device 10.

Figure 4:
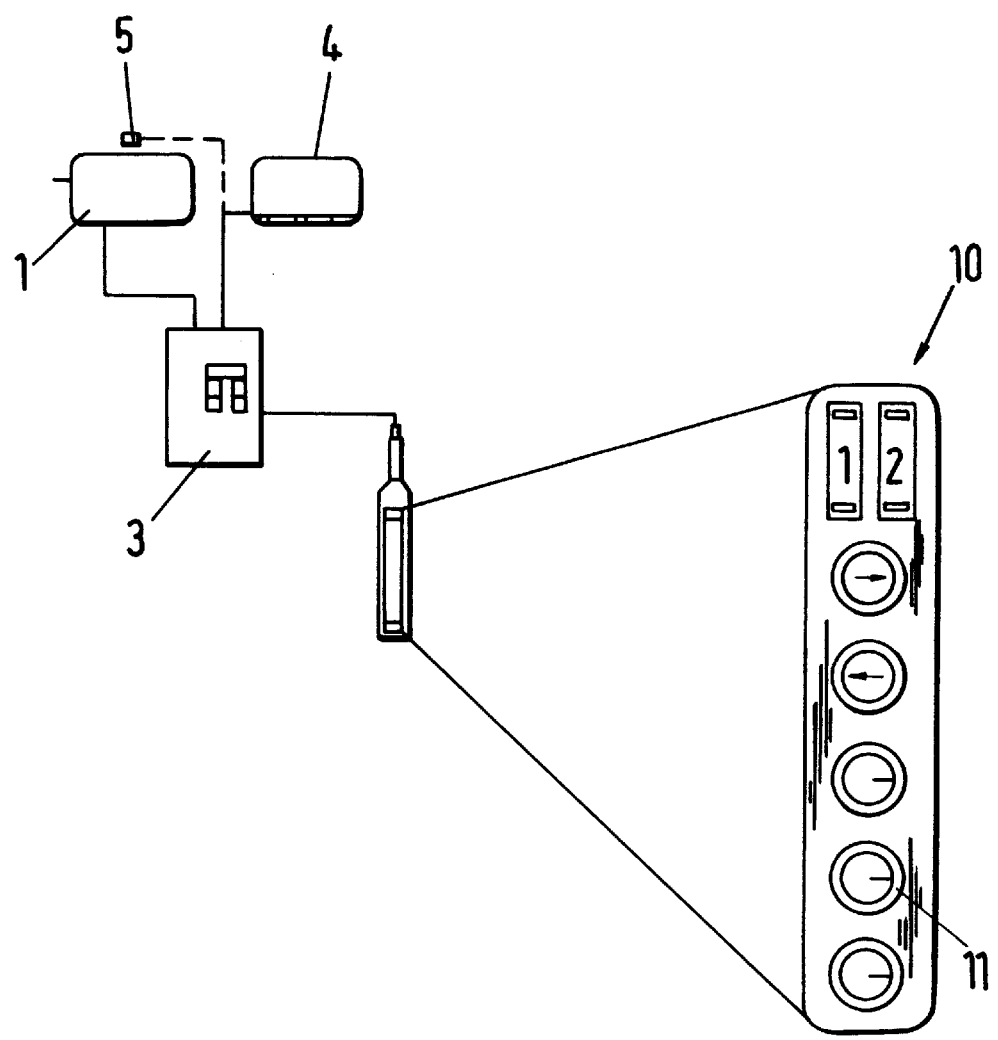
FIG. 4 depicts the apparatus of FIG. 3 with an enlarged view of a preferred control device for inputting target positions.

The desired target position is entered by means of the control switch 10, as shown in FIG. 3, and each individual desired target position is then manually moved towards once by way of the control switch 10. When the desired target position or location is reached, a learning key 11 on the control switch 10, shown in FIG. 4, is actuated and information about the target position is stored in a nonvolatile memory, i.e. a memory which is not susceptible to loss of information due to power loss or outage. The transfer of the stored target positions is effected automatically at the conclusion of the presetting of the target positions by the control switch 10. Thereafter, an optional number of target positions may be moved toward or approached cyclically in an optionally presettable sequence.

In order to achieve high positioning accuracy, each destination is approached at the lowest accountable non-zero speed. Of course, the control device 3 may continuously exchange data with the computer 8, for example so that the sequence of positions to be approached cyclically may be preset directly by the computer 8 or varied as needed.

The path measurement system 4 is preferably an incremental path measurement system because of its relatively simple construction and relatively low susceptibility to disturbance. Nevertheless, a path measurement system using absolute coding may likewise be used as a general matter of design choice.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A process for positioning an object at a preset destination by moving the object along a path to the destination through controlled operation of an electric motor and which is switchable between at least a highest driving speed and a next lower driving speed, comprising the steps of:
    (a) running the motor to accelerate the motor to its highest driving speed as it moves the object along the path;
    (b) measuring an acceleration path of the motor as it accelerates to its highest driving speed;
    (c) automatically determining a first switch-off location for the motor along the path based on the measured acceleration path;
    (d) switching-off the motor at the determined first switch-off location in advance of the preset destination; and
    (e) braking the switched-off motor until reaching the next lower driving speed.

2. The process in accordance with claim 1, wherein said step (c) comprises the steps of:
    (f) calculating a deceleration path based on the measured acceleration path; and
    (g) determining the first switch-off location based on the calculated deceleration path.

3. The process in accordance with claim 2, wherein said step (g) comprises determining the first switch-off location as a function of variations of the deceleration path.

4. The process in accordance with claim 3, wherein said step (g) further comprises the steps of:
    (h) storing the measured acceleration path of the device as a function of load defined by the object being positioned and the calculated deceleration path in a deceleration path memory; and
    (i) calculating the first switch-off location for the highest driving speed based on stored deceleration path values in the deceleration path memory.

5. The process in accordance with claim 4, wherein said step (i) further comprises calculating a second switch-off location for the motor along the path at which the motor is switched off when operating at the next lower driving speed based on the stored deceleration path values in the deceleration path memory.

6. The process in accordance with claim 4, wherein said step (i) further comprises determining the deceleration path by interpolating stored deceleration path values in the deceleration path memory.

7. The process in accordance with claim 1, wherein said step (c) further comprises determining the switch-off location based on a predetermined mathematical model of acceleration behavior and braking behavior of the motor under load.

8. The process in accordance with claim 7, wherein said step (c) further comprises measuring parameters of the mathematical model for calculating the acceleration path and the deceleration path of the motor under changing load conditions.

9. The process in accordance with claim 8, further comprising before said step (a) the steps of:
    (j) determining during a start-up operation an unloaded acceleration path and an unloaded deceleration path without an object load on the motor; and
    (k) calculating for plural driving speeds of the motor a minimum distance along the path of the switch-off location from the destination based on the determined unloaded acceleration path and the determined unloaded deceleration path.

10. The process in accordance with claim 1, further comprising moving the object along the path to a position in advance of the destination, determining whether the positioning process is positioning the object at the destination with an accuracy of a predetermined value, and repeating the positioning process when it is determined that the object is being positioned at the destination with an accuracy less than the predetermined value.

11. The process in accordance with claim 1, further comprising the steps of:
    (l) moving the motor towards a selected target position once manually using a control device; and
    (m) storing information identifying the selected target position in a non-volatile memory upon actuation of an operable learning key on the control device.

12. The process in accordance with claim 11, wherein said steps (l) and (m) are repeated for each of a plurality of selected target positions.

13. The process in accordance with claim 1, wherein the motor moves the object to approach the destination at a lowest driving speed of the motor.

14. An apparatus for positioning an object at a preset destination by moving the object along a path to the destination through controlled operation of a pole changing three-phase induction motor having at least two fixed driving speeds comprising a highest driving speed and a next lower driving speed by advancing the object along the path toward the destination at the highest driving speed and, at a predetermined switch-off location in advance of the preset destination, switching off the motor and braking the movement of the object until the object is moving at the next lower driving speed, said apparatus comprising:
    a path measurement system for detecting information concerning the location of the object along the path;
    an intermediate gear device connected to the motor for positioning the object; and
    a control device connected to the motor and to said path measurement system and operable for controlling operation of the motor based on a program of the control device and the information detected by said path measurement system.

15. The apparatus in accordance with claim 14, wherein said path measurement system is operable to continuously transmit information concerning location, direction of movement and moving speed of the object to said control device.

16. The apparatus in accordance with claim 15, wherein said path measurement system comprises one of an incremental path measurement system and a path measurement system employing absolute coding.

17. The apparatus in accordance with claim 16, further comprising a computer connected to at least one of said programmed control device and a hand-held control device.

18. The apparatus in accordance with claim 17, further comprising a coding switch selectively actuatable for presetting the target position and connected to said control device.

19. The apparatus in accordance with claim 18, wherein said coding switch is disposed in the hand-held control device.

20. The apparatus in accordance with claim 19, wherein said control device further comprises a memory in which acceleration paths and respective deceleration paths of the object and associated with a plurality of the at least two driving speeds of the motor are stored in tabular form as a function of object-defining load.

* * * * *